United States Patent
Koeneman et al.

(10) Patent No.: US 10,214,820 B2
(45) Date of Patent: Feb. 26, 2019

(54) HYDROGEN GENERATION SYSTEM WITH A CONTROLLABLE REACTIVE CIRCUIT AND ASSOCIATED METHODS

(71) Applicant: Joi Scientific, Inc., Merritt Island, FL (US)

(72) Inventors: Robert Louis Koeneman, Cape Canaveral, FL (US); Traver Hall Kennedy, Miami Beach, FL (US)

(73) Assignee: Joi Scientific, Inc., Merritt Island, FL (US)

( * ) Notice: Subject to any disclaimer, the term of this patent is extended or adjusted under 35 U.S.C. 154(b) by 0 days.

(21) Appl. No.: 15/851,853

(22) Filed: Dec. 22, 2017

(65) Prior Publication Data

US 2018/0216241 A1     Aug. 2, 2018

Related U.S. Application Data

(63) Continuation-in-part of application No. 14/852,695, filed on Sep. 14, 2015, which is a continuation-in-part
(Continued)

(51) Int. Cl.
*C25B 1/02*      (2006.01)
*C25B 1/04*      (2006.01)
(Continued)

(52) U.S. Cl.
CPC ............... *C25B 1/04* (2013.01); *C25B 1/02* (2013.01); *C25B 9/04* (2013.01); *C25B 9/06* (2013.01); *C25B 11/02* (2013.01); *C25B 15/02* (2013.01)

(58) Field of Classification Search
CPC ............... C25B 1/04; C25B 9/06; C25B 15/02
See application file for complete search history.

(56) References Cited

U.S. PATENT DOCUMENTS

| 4,424,105 A | 1/1984 | Hanson |
| 4,795,537 A | 1/1989 | Timewell |

(Continued)

FOREIGN PATENT DOCUMENTS

| CN | 202011906 U | 10/2011 |
| CN | 104073838 A | 10/2014 |

(Continued)

OTHER PUBLICATIONS

"Pulsed DC and Anode Depolarization in Water Electrolysis for Hydrogen Generation", Shaaban, Aly H., Aug. 1994.
(Continued)

*Primary Examiner* — Nicholas A Smith
(74) *Attorney, Agent, or Firm* — Krishna Kalidindi

(57) ABSTRACT

A hydrogen generation system includes a pulsed drive signal generator to generate a pulsed drive signal, a hydrogen generation chamber to receive the pulsed drive signal and generate hydrogen from a feedstock material contained therein based on the pulsed drive signal and a controllable reactive circuit coupled between the pulsed drive signal generator and the hydrogen generation chamber. A hydrogen detection device is coupled to the hydrogen generation chamber to detect the generated hydrogen. A controller controls the controllable reactive circuit based on detection of the generated hydrogen.

25 Claims, 11 Drawing Sheets

Related U.S. Application Data of application No. 14/616,851, filed on Feb. 9, 2015, now Pat. No. 9,816,190.

(60) Provisional application No. 62/091,702, filed on Dec. 15, 2014.

(51) Int. Cl.
  *C25B 9/04* (2006.01)
  *C25B 9/06* (2006.01)
  *C25B 11/02* (2006.01)
  *C25B 15/02* (2006.01)

(56) References Cited

U.S. PATENT DOCUMENTS

| | | |
|---|---|---|
| 4,936,961 A | 6/1990 | Meyer |
| 5,037,518 A | 8/1991 | Young et al. |
| 6,332,434 B1 | 12/2001 | DeSouza et al. |
| 6,790,324 B2 | 9/2004 | Chambers |
| 7,240,641 B2 | 7/2007 | Balan et al. |
| 7,452,449 B2 | 11/2008 | Weinberg et al. |
| 7,604,728 B2 | 10/2009 | Schlager |
| 7,615,138 B2 | 11/2009 | Davidson |
| 8,709,221 B1 | 4/2014 | Smith |
| 8,852,410 B1 | 10/2014 | Turgeon |
| 8,940,151 B1 | 1/2015 | Hartvigsen et al. |
| 8,940,243 B1 | 1/2015 | Fahimi |
| 9,034,167 B2 | 5/2015 | Finfrock et al. |
| 9,347,142 B1 * | 5/2016 | Koeneman ............ C25B 15/02 |
| 9,353,451 B2 | 5/2016 | Haywood |
| 9,816,190 B2 | 11/2017 | Koeneman |
| 2006/0060464 A1 | 3/2006 | Chang |
| 2007/0080071 A1 | 4/2007 | Perry, Jr. |
| 2007/0216165 A1 | 9/2007 | Oohara |
| 2007/0272546 A1 | 11/2007 | Matthews |
| 2008/0186004 A1 | 8/2008 | Williams |
| 2008/0277273 A1 | 11/2008 | Logan |
| 2008/0302670 A1 | 12/2008 | Boyle |
| 2009/0045073 A1 | 2/2009 | Stone et al. |
| 2009/0266706 A1 | 10/2009 | Fukui et al. |
| 2009/0283402 A1 * | 11/2009 | Osman ............... C25B 1/04 204/230.8 |
| 2010/0089746 A1 | 4/2010 | Chang |
| 2010/0175941 A1 | 7/2010 | Khodabakhsh |
| 2010/0183931 A1 | 7/2010 | Hedman |
| 2011/0146599 A1 | 6/2011 | Sciban et al. |
| 2011/0259757 A1 | 10/2011 | Vancina |
| 2012/0012456 A1 | 1/2012 | Darrel |
| 2012/0058405 A1 | 3/2012 | Kirchoff |
| 2012/0104766 A1 | 5/2012 | Davidson |
| 2012/0111734 A1 | 5/2012 | Kramer |
| 2012/0152197 A1 * | 6/2012 | Inskeep ............... C01B 3/042 123/1 A |
| 2012/0175247 A1 | 7/2012 | Darrel |
| 2012/0199472 A1 | 8/2012 | Curfew |
| 2012/0222954 A1 | 9/2012 | Lothring |
| 2013/0118908 A1 | 5/2013 | Radu |
| 2014/0048067 A1 | 2/2014 | McGill |
| 2014/0363806 A1 | 12/2014 | Fillipone |
| 2014/0367269 A1 * | 12/2014 | Inskeep ............... C01B 3/042 205/335 |
| 2016/0068976 A1 | 3/2016 | Yoshida et al. |
| 2017/0044677 A1 | 2/2017 | Kurokawa |

FOREIGN PATENT DOCUMENTS

| | | |
|---|---|---|
| DE | 2713533 | 9/1978 |
| EP | 0 975 822 B1 | 2/2004 |
| JP | 2006257480 A2 | 3/2005 |
| JP | 2006037214 A2 | 2/2006 |
| JP | 2013231213 A | 11/2013 |
| KR | 20130112204 A | 10/2013 |
| WO | 2004097072 A1 | 11/2004 |
| WO | 2007131254 A2 | 11/2007 |
| WO | 20100024965 A1 | 3/2010 |
| WO | 2010084358 A2 | 7/2010 |
| WO | 2011139893 A1 | 11/2011 |
| WO | 2013031522 A1 | 3/2013 |
| WO | 2014028951 A1 | 2/2014 |
| WO | 20140064470 A1 | 5/2014 |
| WO | 2015098058 A1 | 7/2015 |
| WO | 2015137889 A1 | 9/2015 |
| WO | 2016054371 A1 | 4/2016 |
| WO | 2016068842 A1 | 5/2016 |
| WO | 2017004732 A1 | 1/2017 |

OTHER PUBLICATIONS

"Economical Hydrogen Production by Electrolysis Using Nano Pulsed DC", Dharmaraj, C. H. and AdishKumar, S.; International Journal of Energy and Environment, vol. 3, Issue 1, pp. 129-136, 2012.

"Review of Pulsed Power for Efficient Hydrogen Production", Monk, N. and Watson, S. J.; International Journal of Hydrogen Energy, 41 (19), pp. 7782-7791, 2016.

"Effects of Geometry of Electrodes and Pulsating DC Input on Water Splitting for Production of Hydrogen", Mandal, Biswajit, Sirkar, A., Shau, Abhra, De, P. and Ray, P.; International Journal of Renewable Energy Research, vol. 2, No. 1, 2012.

"Influence of Electrical Conductivity and pH on Hydrogen Production Using Pulsed Discharge Over the Water Surface", Ihara, Takeshi, Ide, Yusuke, Nagata, Hideo, Yagyu, Yoshihito, Ohshima, Tamiko, Kawasaki, Hiroharu, Suda, Yoshiaki; Plasma Science (ICOPS), 2016—Abstract.

"DC Electrical Breakdown of Water in a Sub-Micron Planar Gap", Song, Chunrong and Wang, Pingshan; IEEE 2009.

International Search Report (ISR)—PCT/US2015/065854—dated Mar. 10, 2016—6 pages (including notification of transmittal of the ISR and WO of the ISA).

Written Opinion (WO) of International Search Authority (ISA)— PCT/US2015/065854—dated Mar. 10, 2016—7 pages.

International Search Report (ISR)—PCT/US2015/065785—dated Mar. 4, 2016—6 pages (including notification of transmittal of the ISR and WO of the ISA).

Written Opinion (WO) of International Search Authority (ISA)— PCT/US2015/065785—dated Mar. 4, 2016—8 pages.

http://web.archive.org/web/20130130100756/https://en.wikipedia.org/wiki/Band-stop_filter—Jan. 20, 2013.

"Water Electrolysis with Voltage Inductive Pulses", Vanags, Martins et al., Electrolysis, Chapter 2, 2012.

\* cited by examiner

HYDROGEN GENERATION SYSTEM WITH A CONTROLLABLE REACTIVE CIRCUIT AND ASSOCIATED METHODS

RELATED APPLICATIONS

This application is a continuation-in-part of U.S. patent application Ser. No. 14/852,695 filed Sep. 14, 2015, which is continuation-in-part of U.S. patent application Ser. No. 14/616,851 filed Feb. 9, 2015, which claims the benefit of U.S. Provisional Application Ser. No. 62/091,702 filed Dec. 15, 2014, the entire contents of which are incorporated herein by reference.

TECHNICAL FIELD

The present disclosure relates to the field of hydrogen generation systems, and more particularly, to a hydrogen generation system with a controllable reactive circuit to generate hydrogen from feedstock, and associated methods.

BACKGROUND

Currently, the majority of the energy consumed by the developed world has its origins in fossil fuels. Unfortunately, there are many well-documented problems associated with over-reliance upon energy generated from fossil fuels. These problems include pollution and climate change caused by the emission of greenhouse gases, the finite nature of fossil fuels and the dwindling reserves of such carbon-based energy sources and the concentration of control of petroleum-based energy supplies by various volatile countries and OPEC.

Accordingly, there is a need for alternative sources of energy. One such alternative energy source includes hydrogen generation systems that produce hydrogen via hydrolysis. Ideally, such hydrogen generation systems would be capable of producing hydrogen gas without the presence of oxygen, wherein such hydrogen may be used for industrial, commercial and residential purposes.

For example, when greater than 99% pure, hydrogen may be used in generator cooling, steel production, glass production, and semiconductor and photovoltaic cell production. When less than 99% pure, hydrogen may be used in various industries, such as the aerospace industry, the animal feed industry, the automotive industry, the baking industry, the chemical industry, the ethanol industry, the food processing industry, the dairy industry, the meat industry, the manufacturing industry, the medical industry, the hospitality industry, the laundry/uniform industry, the marine and offshore industry, the military and defense industry, the mining industry, the oil and gas industry, the paper/corrugating industry, the pharmaceutical industry, the rubber industry, the steel and metals industry, the tobacco industry, the transportation industry, the wire and cable industry and the education industry.

Unfortunately, there are a number of significant hurdles that prevent the widespread use of hydrogen in commercial, industrial, and residential applications. These hurdles include cost, efficiency, and safety. First and foremost, creating hydrogen gas in a traditional manner is inefficient and costly, or even environmentally harmful when produced via reformation (i.e., the primary commercial method). Secondly, hydrogen's very low mass and energy density makes it challenging to get enough mass of hydrogen gas safely in one place to be of practical value to a user. The result is that hydrogen has been prohibitively expensive to produce, compress, cryogenically cool, maintain (at pressure and temperature), contain (due to its very small molecule structure) and transport. Accordingly, pressure, temperature, flammability, explosiveness and low ignition energy requirement are all significant safety issues concerning the widespread use of hydrogen.

SUMMARY

A hydrogen generation systems comprises: a pulsed drive signal generator to generate a pulsed drive signal; a hydrogen generation chamber to receive the pulsed drive signal and generate hydrogen from a feedstock material contained therein based on the pulsed drive signal; and a controllable reactive circuit coupled between the pulsed drive signal generator and the hydrogen generation chamber. A hydrogen detection device may be coupled to the hydrogen generation chamber to detect the generated hydrogen. A controller may control the controllable reactive circuit based on detection of the generated hydrogen.

Purity and production rate of the generated hydrogen as determined by the hydrogen detection device may be used to measure performance of the hydrogen generation chamber. The controllable reactive circuit is advantageously used to improve performance of the hydrogen generation system by presenting a varying reactive load to damped sine waves generated within the hydrogen generation chamber.

The hydrogen detection device may comprise a mass spectrometer to determine the purity of the generated hydrogen and wherein the controller may be configured to control the controllable reactive circuit based on the purity of the generated hydrogen.

The hydrogen detection device may comprise a hydrogen flow meter to determine the production rate of the generated hydrogen and wherein the controller may be configured to control the controllable reactive circuit based on the production rate of the generated hydrogen.

The damped sine waves are generated within the hydrogen generation chamber based on interaction between the pulsed drive signal and the feedstock material and wherein the controller may control the controllable reactive circuit so as to present a varying load reactance to the damped sine waves.

The controller may be configured to control the controllable reactive circuit based on detection of the generated hydrogen and the damped sine waves. The damped sine waves may include a DC signal with a plurality of embedded interactive chamber signals with at least one of the embedded interactive chamber signals corresponding to the hydrogen being generated. The controller may be further configured to analyze the at least one embedded interactive chamber signal corresponding to the hydrogen being generated.

The controllable reactive circuit may comprise: a first variable load reactance circuit coupled between a first terminal of the pulsed drive signal generator and a first terminal of the hydrogen generation chamber; and a second variable load reactance circuit coupled between a second terminal of the pulsed drive signal generator and a second terminal of the hydrogen generation chamber. The variable load reactance circuits may be cross-coupled to one another.

Another aspect is directed to a hydrogen generation system comprising a pulsed drive signal generator configured to generate a pulsed drive signal and a hydrogen generation chamber configured to receive the pulsed drive signal and generate hydrogen from a feedstock material contained therein, with damped sine waves being generated within the hydrogen generation chamber based on interaction between the pulsed drive signal and the feedstock material. A controllable reactive circuit having a controllable load reactance may be coupled between the pulsed drive signal generator and the hydrogen generation chamber. A hydrogen detection device may be coupled to the hydrogen generation chamber and configured to detect the generated hydrogen. A controller may be configured to control the load reactance in the controllable reactive circuit based on detection of the generated hydrogen and the damped sine waves.

Yet another aspect is directed to a method for operating the hydrogen generation system as described above. The method comprises detecting the hydrogen generated by the hydrogen generation chamber, and controlling a load reactance of the controllable reactive circuit based on detection of the generated hydrogen.

DETAILED DESCRIPTION

Exemplary embodiments will be described more fully hereinafter with reference to the accompanying drawings. These embodiments should not be construed as limited to those illustrated and described herein as other forms and are provided so that this disclosure will be thorough and complete and convey the scope to those skilled in the art. Like numbers refer to like elements throughout, and prime notations are used to indicate alternate embodiments.

Hydrogen Generation System Overview

Figure 1:
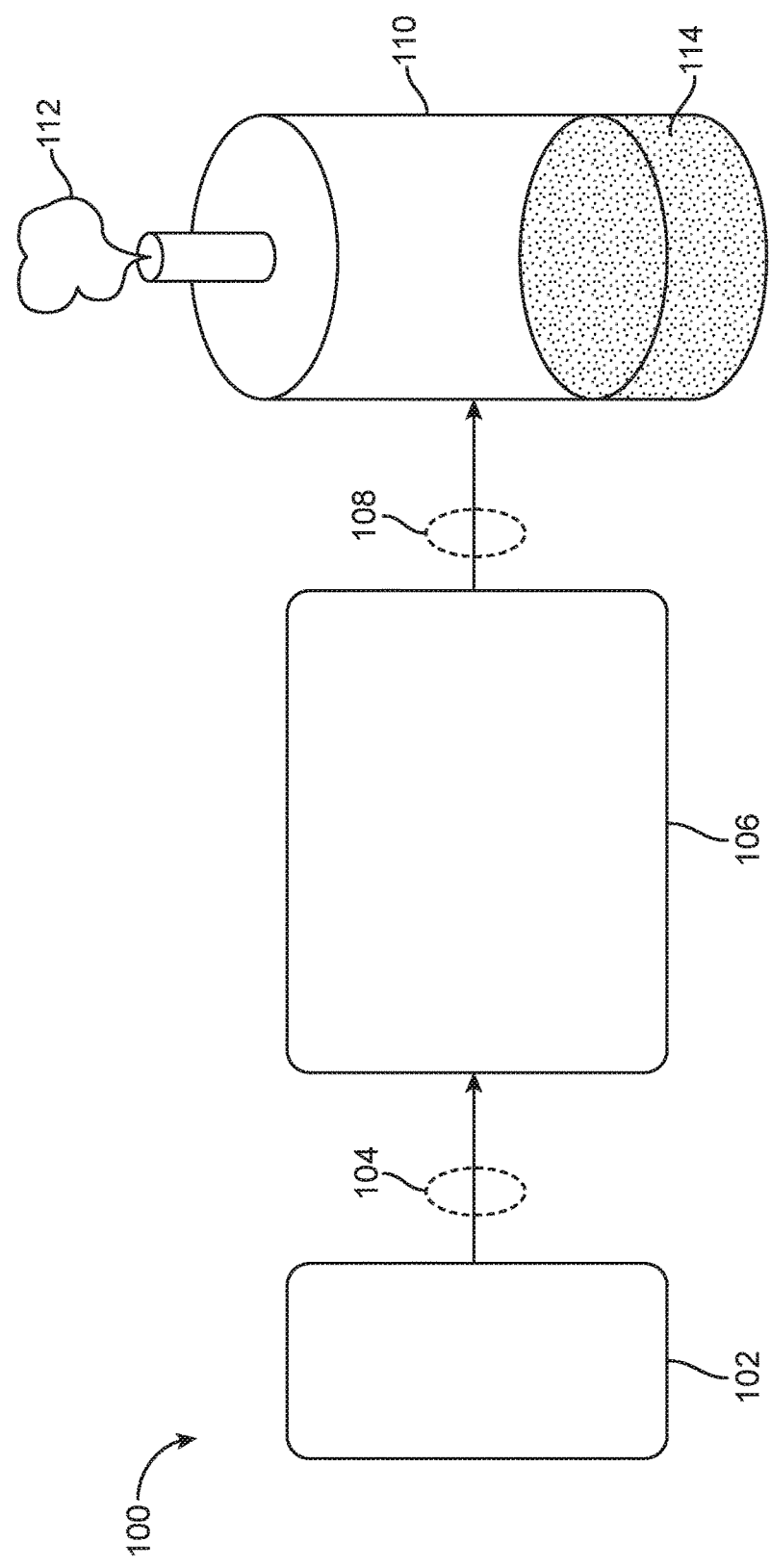
FIG. 1 is a diagrammatic view of a hydrogen generation system in accordance with the disclosure.

Referring to FIG. 1, there is shown hydrogenation generation system 100. Hydrogen generation system 100 may include signal generation system 102 configured to generate a driver signal 104. An example driver signal 104 may include but is not limited to a pulsed DC signal. Driver signal 104 may be provided to signal processing system 106, wherein signal processing system 106 may be configured to process driver signal 104 and generate a chamber excitation signal 108.

Hydrogen generation system 100 may include hydrogen generation chamber 110 that may be configured to receive chamber excitation signal 108 and generate hydrogen 112 (e.g., gaseous hydrogen) from feedstock 114 contained within hydrogen generation chamber 110.

As discussed above, hydrogen 112 produced by hydrogen generation system 100 may be used with various industries, such as the aerospace industry, the animal feed industry, the automotive industry, the baking industry, the chemical industry, the ethanol industry, the food processing industry, the dairy industry, the meat industry, the manufacturing industry, the medical industry, the hospitality industry, the laundry/uniform industry, the marine and offshore industry, the military, the mining industry, the oil and gas industry, the paper/corrugating industry, the pharmaceutical industry, the rubber industry, the steel and metals industry, the tobacco industry, the transportation industry, the wire and cable industry and the education industry.

As discussed above, hydrogen generation system 100 may generate hydrogen 112 (e.g., gaseous hydrogen) from feedstock 114 contained within hydrogen generation chamber 110. One example of feedstock 114 may include but is not limited to sea water. Accordingly and in certain implementations, hydrogen generation system 100 may be positioned proximate a source of feedstock 114. Alternatively, feedstock 114 may be provided to hydrogen generation system 100 via a delivery network, not shown.

Hydrogen generation chamber 110, when filled with an electrolytic fluid (e.g., feedstock 114), may react like a variable capacitive load with corresponding variable impedance values. When a Pulsed DC signal (e.g., chamber excitation signal 108) is applied to hydrogen generation chamber 110, the result may be a reactive load. Hydrogen generation chamber 110 may complete the closed circuit path that forms the load factor during the ON Cycle Pulse (OCP) of chamber excitation signal 108.

The electrolytic fluid (e.g., feedstock 114) may change state both chemically and electronically during the OCP of chamber excitation signal 108. These changes may affect the charge state of feedstock 114, changing the above-described capacitive and impedance values, which may be monitored via a differential potential voltage measurement across the anode and cathode of hydrogen generation chamber 110.

Signal processing system 106 may provide impedance matching and capacitive balancing during the OCP of chamber excitation signal 108. Balancing of signal processing system 106 may accomplish multiple functions, including but not limited to lowering reactive circuit current demand while directing chamber excitation signal 108 with a given base frequency across the electrodes of hydrogen generation chamber 110.

During the OFF Cycle Pulse (OFCP) of chamber excitation signal 108, the inductive and capacitive sections of signal processing system 106 may receive energy from hydrogen generation chamber 110 as hydrogen generation chamber 110 discharges.

Signal Generation System Configuration

Figure 2:
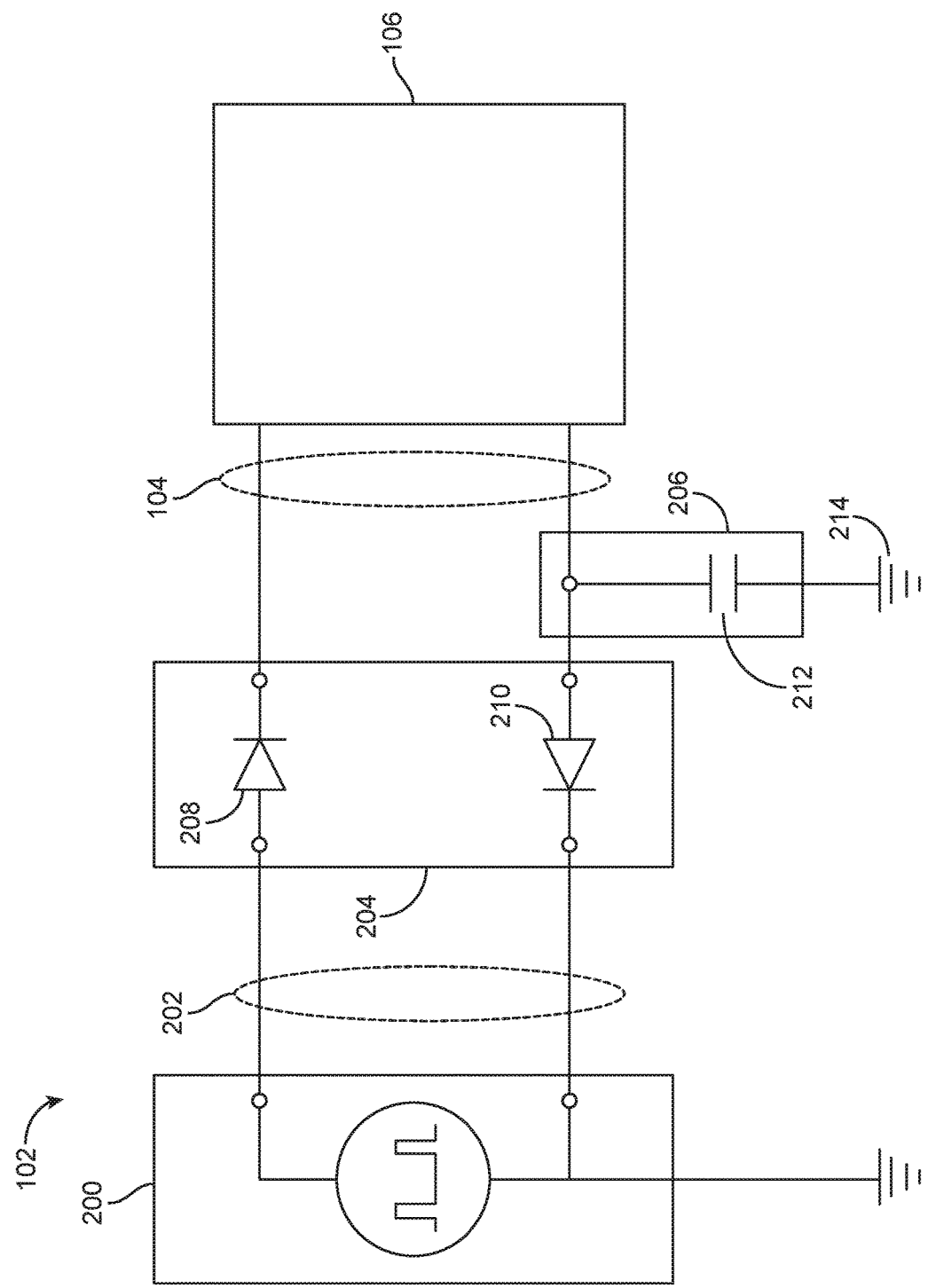
FIG. 2 is a diagrammatic view of a signal generation system included within the hydrogen generation system of FIG. 1.

Referring to FIG. 2, there is shown one implementation of signal generation system 102. Signal generation system 102 may include pulsed DC source 200 configured to generate pulsed DC source signal 202. Signal generation system 102 may include mono-directional blocking circuit 204 configured to receive pulsed DC source signal 202 and generate driver signal 104. Signal generation system 102 may also include filter circuit 206 configured to filter driver signal 104 and remove AC components.

Mono-directional blocking circuit 204 may include at least one asymmetrically conductive component, an example of which includes but is not limited to a diode (e.g., a Schottky diode), such as a 1N4003G diode available from ON Semiconductor configured to function as blocking diodes. In a typical configuration, mono-directional blocking circuit 204 may include two asymmetrically conductive components 208, 210. Filter circuit 206 may include capacitor 212 coupled to ground 214 that is sized to remove any undesirable AC signal components. An example of capacitor 212 may include a 470 microfarad capacitor available from Mouser Electronics.

One implementation of driver signal 104 generated by signal generation system 102 may be a driver signal that has a duty cycle of less than 25%. Specifically and in a preferred embodiment, driver signal 104 may have a duty cycle between 6.5% and 13%, wherein during 6.5%-13% of the waveform of driver signal 104, driver signal 104 has an amplitude of 4.5 to 10 VDC and during 87%-93.5% of the waveform of driver signal 104, driver signal 104 has an amplitude of 0 VDC. The above-described implementations of driver signal 104 are intended to be illustrative and not all inclusive. Accordingly, these are intended to be merely examples of the various driver signals that be utilized by signal generation system 102.

Operation of the Signal Generation System

Concerning driver signal 104 generated by signal generation system 102, the rise time of driver signal 104 may be critical to the overall function and performance of hydrogen generation chamber 110. Accordingly, a rise time as close to instantaneous as possible (e.g., as close to a truly vertical sweep) may result in the most efficient operation of hydrogen generation chamber 110. Further, the amplitude of driver signal 104 may be increased/decreased to vary the performance of hydrogen generation chamber 110 and the quantity of hydrogen 112 produced.

Signal generation system 102 may be configured to provide for adjustments in the pulse width and/or duty cycle of driver signal 104. Any pulse width and/or duty cycle adjustments may be based on the desired chamber performance. The timing of the duty cycle of driver signal 104 may establish a base frequency for driver signal 104. In a preferred embodiment, the pulse base frequency of driver signal 104 may range from 100 hertz to 10 kilohertz (however, frequencies outside of this range may also be utilized).

The diodes (e.g., asymmetrically conductive components 208, 210) utilized in mono-directional blocking circuit 204 may perform several functions. Typically, Schottky diodes have forward biases of approximately 1 mA in the range 0.15 to 0.46 volts. This lower forward voltage may provide for higher switching speeds and better system efficiency, wherein Schottky diodes are considered to have essentially instant reverse recovery time.

The two diodes (e.g., asymmetrically conductive components 208, 210) may provide a first stage voltage clamp that may enhance rise time and forward current build up, which may be important during each startup of the OCP. The blocking diodes (e.g., asymmetrically conductive components 208, 210) may provide transient voltage suppression during initial charging of hydrogen generation chamber 110. This may allow hydrogen generation chamber 110 to reach full voltage amplitude in the least amount time.

The two diodes (e.g., asymmetrically conductive components 208, 210) may also prevent voltage returned from hydrogen generation chamber 110 from interfering with pulsed DC source signal 202, thus isolating the downstream circuit (e.g., signal processing system 106) during the off cycle while the reactive part of this circuit is in the recovery phase and exposed to a return voltage in the range of 0.90 VDC to 4.5 VDC.

Positive Reactive Circuit Configuration

Figure 3:
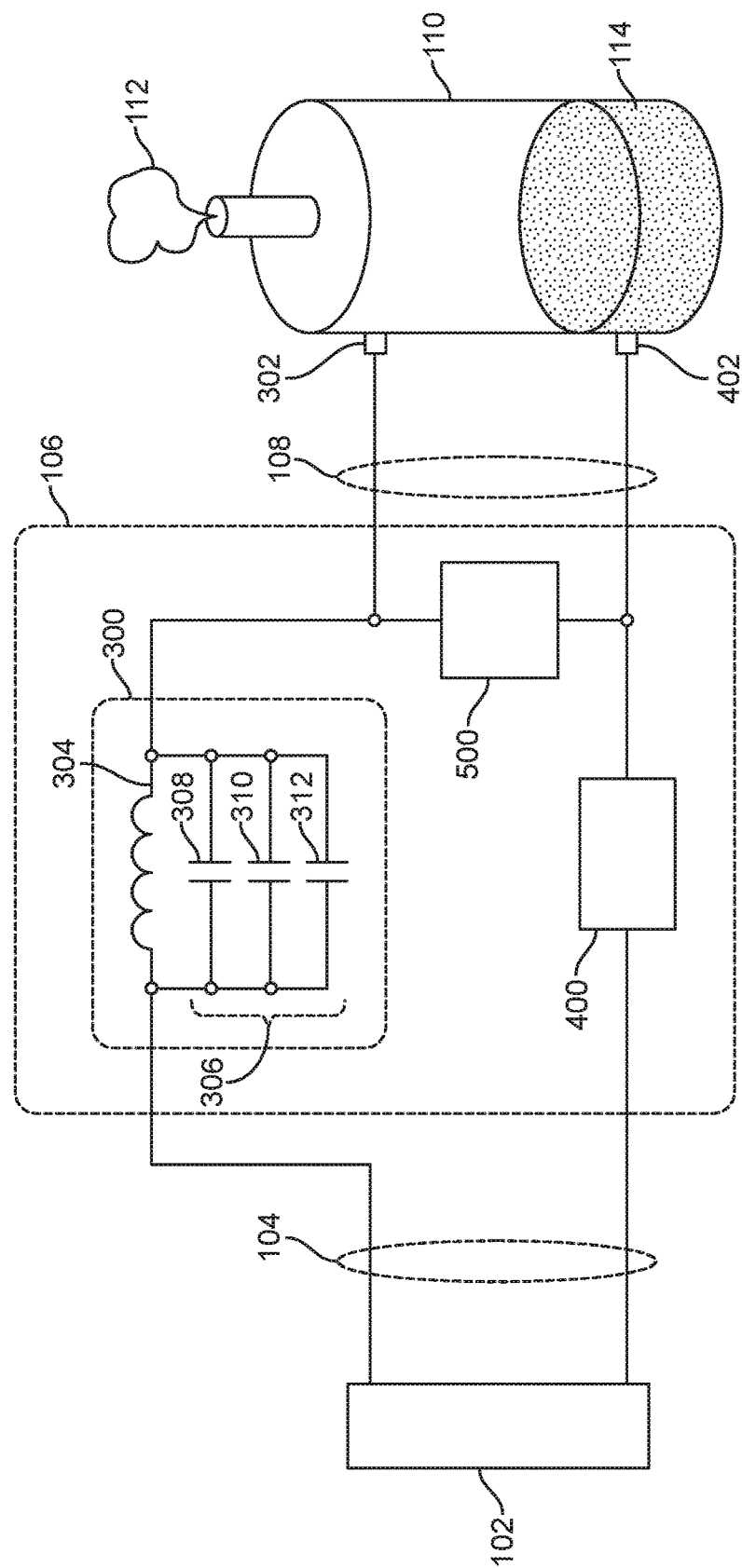
FIG. 3 is a diagrammatic view of a positive reactive circuit included within the hydrogen generation system of FIG. 1.

Referring to FIG. 3, there is shown one implementation of signal processing system 106, wherein signal processing system 106 is shown to include positive reactive circuit 300. Positive reactive circuit 300 may be coupled to anode 302 of hydrogen generation chamber 110.

In one implementation, positive reactive circuit 300 may include inductive component 304 and capacitive component 306. One example of inductive component 304 may include a 10 microhenry inductor available from Mouser Electronics. Inductive component 304 may be in parallel with capacitive component 306. Capacitive component 306 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Inductive component 304 may be constructed of/formed from several individual inductors that may be arranged (in a parallel and/or series configuration) to achieve the desired inductance value. Additionally (and as will be discussed below), capacitive component 306 may be constructed of/formed from several individual capacitors that are arranged (in a parallel and/or series configuration) to achieve the desired capacitive value.

In one implementation, capacitive component 306 may include a plurality of discrete capacitors. For example, capacitive component 306 may include three discrete capacitors (e.g., capacitors 308, 310, 312) arranged in parallel to form a parallel capacitor circuit. In one particular implementation, capacitor 308 may be a 45 microfarad capacitor available from Mouser Electronics, capacitor 310 may be a 1 picofarad capacitor available from Mouser Electronics, and capacitor 312 may be a 5 nanofarads capacitor available from Mouser Electronics. This parallel capacitor circuit (e.g., the parallel combination of capacitors 308, 310, 312) may be coupled in parallel with inductive component 304, wherein the output of the parallel capacitor circuit (e.g., the parallel combination of capacitors 308, 310, 312) and inductive component 304 may be provided to anode 302 of hydrogen generation chamber 110.

In this particular implementation, positive reactive circuit 300 may be configured as a band-stop filter. As is known in the art and in signal processing, a band-stop filter (or band-rejection filter) is a filter that passes most frequencies unaltered (i.e., unattenuated), while attenuating those frequencies that are within a defined range. As with any other LC filter, the particular range of frequencies that are attenuated may be defined based upon the value of the capacitors (e.g., capacitors 308, 310, 312) and inductors (e.g., inductive component 304) included within positive reactive circuit 300.

Negative Reactive Circuit Configuration

Figure 4:
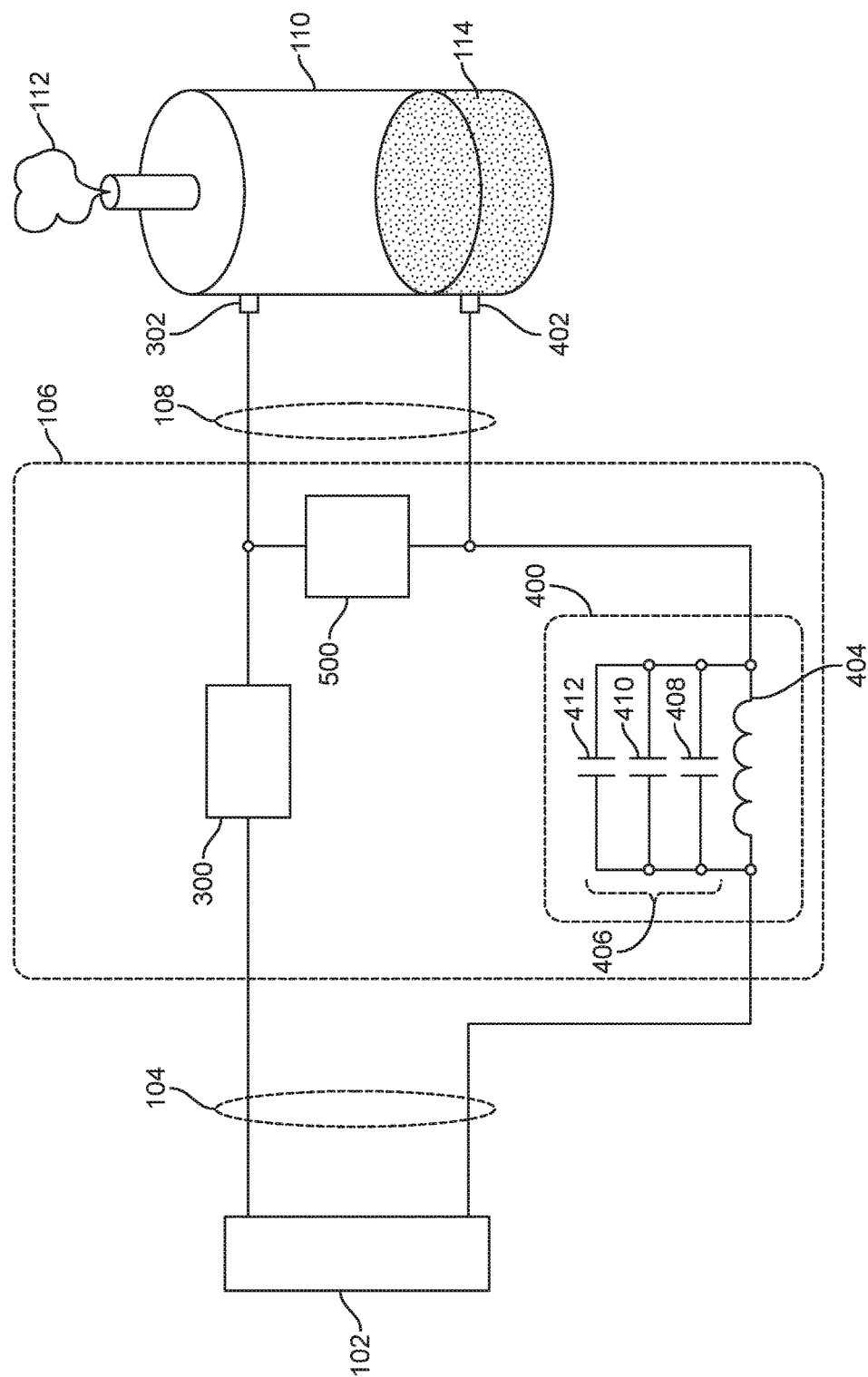
FIG. 4 is a diagrammatic view of a negative reactive circuit included within the hydrogen generation system of FIG. 1.

Referring to FIG. 4, there is shown one implementation of signal processing system 106, wherein signal processing system 106 is shown to include negative reactive circuit 400. Negative reactive circuit 400 may be coupled to cathode 402 of hydrogen generation chamber 110.

In one implementation, negative reactive circuit 400 may include inductive component 404 and capacitive component 406. One example of inductive component 404 may include a 100 microhenry inductor available from Mouser Electronics. Inductive component 404 may be in parallel with capacitive component 406. Capacitive component 406 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Inductive component 404 may be constructed of/formed from several individual inductors that may be arranged (in a parallel and/or series configuration) to achieve the desired inductance value. Additionally (and as will be discussed below), capacitive component 406 may be constructed of/formed from several individual capacitors that are arranged (in a parallel and/or series configuration) to achieve the desired capacitive value.

In one implementation, capacitive component 406 may include a plurality of discrete capacitors. For example, capacitive component 406 may include three discrete capacitors (e.g., capacitors 408, 410, 412) arranged in parallel to form a parallel capacitor circuit. In one particular implementation, capacitor 408 may be a 1 microfarad capacitor available from Mouser Electronics, capacitor 410 may be a 1 picofarad capacitor available from Mouser Electronics and capacitor 412 may be a 5 nanofarads capacitor available from Mouser Electronics. This parallel capacitor circuit (e.g., the parallel combination of capacitors 408, 410, 412) may be coupled in parallel with inductive component 404, wherein the output of the parallel capacitor circuit (e.g., the parallel combination of capacitors 408, 410, 412) and inductive component 304 may be provided to cathode 402 of hydrogen generation chamber 110.

In this particular implementation, negative reactive circuit 400 may be configured as a band-stop filter. As is known in the art and in signal processing, a band-stop filter (or band-rejection filter) is a filter that passes most frequencies unaltered (i.e., unattenuated), while attenuating those frequencies that are within a defined range. As with any other LC filter, the particular range of frequencies that are attenuated may be defined based upon the value of the capacitors (e.g., capacitors 408, 410, 412) and inductors (e.g., inductive component 404) included within negative reactive circuit 400.

Feedback Circuit Configuration

Figure 5:
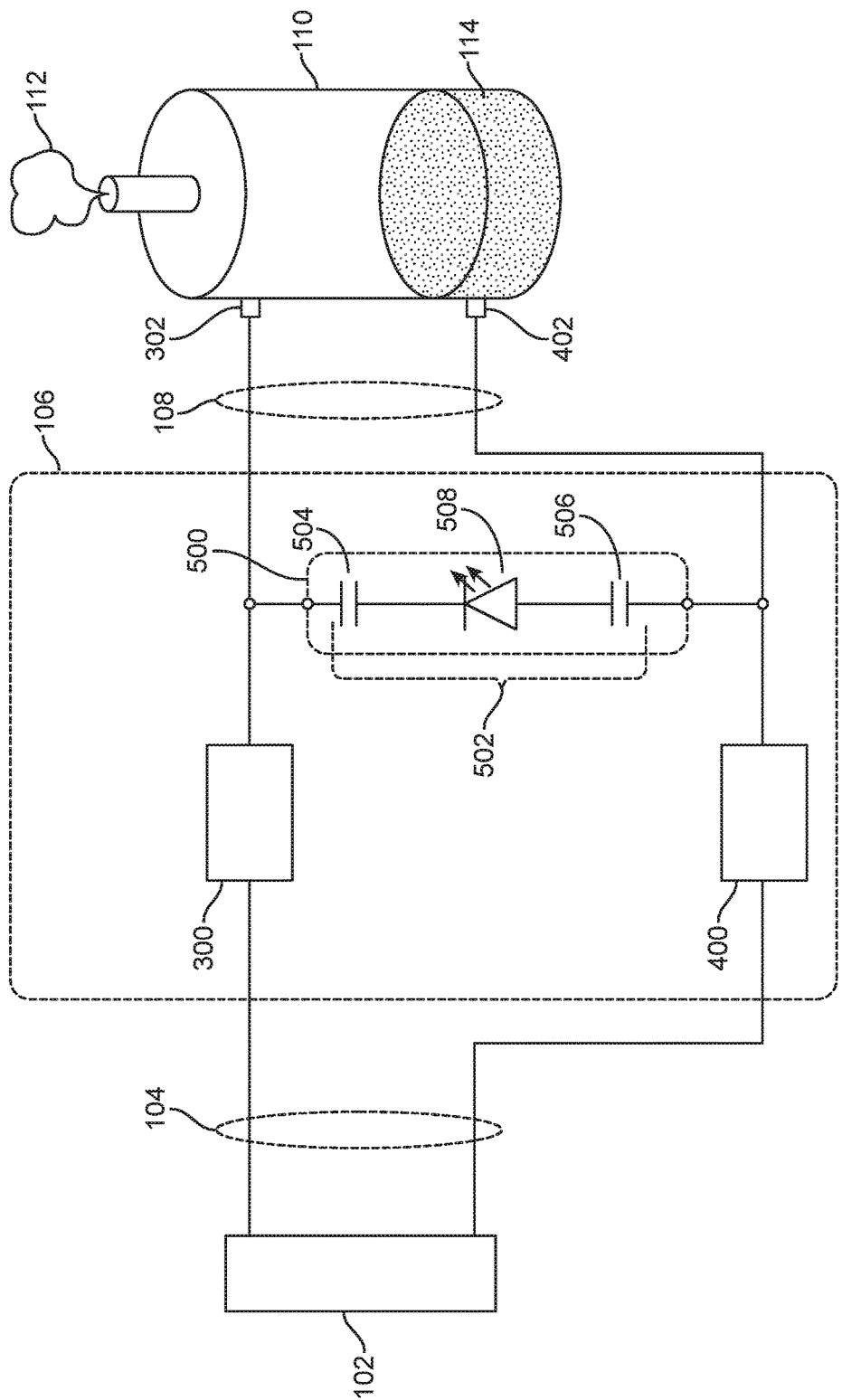
FIG. 5 is a diagrammatic view of a feedback circuit included within the hydrogen generation system of FIG. 1.

Referring to FIG. 5, there is shown one implementation of signal processing system 106, wherein signal processing system 106 is shown to include feedback circuit 500. Feedback circuit 500 may be configured to couple anode 302 of hydrogen generation chamber 110 to cathode 402 of hydrogen generation chamber 110.

In one implementation, feedback circuit 500 may include capacitive component 502. Capacitive component 502 may be sized based, at least in part, upon one or more physical characteristics of hydrogen generation chamber 110 (e.g., size, shape, electrode type, configuration and dimensions) and/or one or more physical characteristics of feedstock 114 (e.g., feedstock type and contents included therein) contained within hydrogen generation chamber 110.

Capacitive component 502 may include two discrete capacitors (e.g., capacitors 504, 506). In one particular implementation, capacitor 504 may be a 1 microfarad capacitor available from Mouser Electronics and capacitor 506 may be a 1 microfarad capacitor available from Mouser Electronics. A first of the discrete capacitors (e.g., capacitor 504) may be coupled to anode 302 of hydrogen generation chamber 110. A second of the discrete capacitors (e.g., discrete capacitor 506) may be coupled to cathode 402 of hydrogen generation chamber 110.

Feedback circuit 500 may include asymmetrically conductive component 508, wherein asymmetrically conductive component 508 may be positioned between the two discrete capacitors (e.g., capacitors 504, 506). One example of asymmetrically conductive component 508 may include, but is not limited to, a diode (e.g., a light emitting diode), such as a RED/diffused T-1 (3 mm) 696-SSL-LX3044ID available from Mouser Electronics.

Operation of the Signal Processing System

Concerning the reactive circuits (e.g., positive reactive circuit 300 and negative reactive circuit 400), these circuits may incorporate an inductor in parallel with a plurality of capacitors (as discussed above). Upon the initiation of the OCP, these inductors may oppose any rise in current. This opposition may be part of the electronic clamp during the rise time of the OCP. The capacitors in parallel with the inductor may start to charge during the rise time of the OCP and provide a path for electron flow in the direction of the hydrogen generation chamber 110.

These capacitors may not be able to overcome the voltage amplitude of hydrogen generation chamber 110 and, therefore, may not be able to discharge during the OCP time. As these capacitors may be relatively small and may reach full charge status during the rise time of OCP and may remain charged during the duration of the OCP.

The slight opposition to current change (by the inductor) during the OCP rise time may quickly dissipate, wherein the inductor opposes current change based upon magnetically induced resistance to the current flow.

Hydrogen generation chamber 110 may function as a load for signal processing system 106, wherein hydrogen generation chamber 110 may have a varying internal resistance and a varying voltage amplitude. Hydrogen generation chamber 110 may behave similarly to an inductive/capacitive electronic component, wherein variations may occur based upon varying electrolytic conditions that can vary dramatically during the rise time of the OCP. These varying conditions may continue during the length of the duty cycle and may be in the form of a charge ion state triggering charging of hydrogen generation chamber 110. The electron density within hydrogen generation chamber 110 may increase dramatically within hydrogen generation chamber 110. This electron density may be at its greatest at a circumference slightly larger than the outer diameter of cathode 402.

The ON cycle rise time and duration of the duty cycle may cause a molecular polarity shift within the electrolytic fluid (e.g., feedstock 114). This molecular polarity shift may have a corresponding electromagnetic/electrostatic component. Due to the shape and geometry of hydrogen generation chamber 110 and without a defined electron flow pathway, the electromagnetic component will have a chaotic characteristic, wherein this chaotic characteristic may assist in the molecular splitting of gas atoms from the water molecules within the electrolytic fluid (e.g., feedstock 114) due to a constant molecular charge imbalance.

The OFF cycle of signal processing system 106 may start at the beginning of the OFCP. The blocking diodes (e.g., asymmetrically conductive components 208, 210) are in the cutoff state which may isolate signal generation system 102 from signal processing system 106. A pulsed DC input base signal set to one kilohertz may reach the cutoff state one-thousand times per second. During the OFF cycle, the electrolytic fluid (e.g., feedstock 114) in hydrogen generation chamber 110 may change from a charge state to a reset discharge cycle. During this OFF cycle, all electronic interactions may be energized from energy recovered (or harvested) from hydrogen generation chamber 110.

The charge amplitude of hydrogen generation chamber 110 may have a characteristic fast decline from greater than 3.5 VDC to less than 1.4 VDC. The decline curve sweep angle may be dependent on the pulsed DC input frequency and the configuration of the reaction circuits (e.g., positive reaction circuit 300 and negative reaction circuit 400).

During the cutoff initiation, the first decline sequence to occur is the collapse of the electron density column surrounding cathode 402. This high density electron column may be held in place by the induced magnetic field that is a result of the OCP. This collapse may cause an electronic flashback (or rapid energy release) from hydrogen generation chamber 110 to the reactive circuit (e.g., positive reaction circuit 300 and/or negative reaction circuit 400), which is similar to an electrostatic discharge and may provide the electrolytic fluid (e.g., feedstock 114) with a pathway to start a change in state of polarity releasing additional stored energy.

Once the electron column proximate cathode 402 starts to collapse, there is a fast rise in potential on negative reactive circuit 402. At this point, there may be an imbalance with positive reactive circuit 302. The inductor within negative reactive circuit 402 may have a rise in potential imposing an impedance value that may allow the parallel capacitors to discharge in the opposite direction to the charge state during the OCP. This situation may create a latching circuit potential through hydrogen generation chamber 110 as the pathway for electron flow.

The return energy from hydrogen generation chamber 110 may be a DC signal with embedded AC components, wherein these AC components may be relatively small in amplitude. The AC components may be driven by the molecular polarity shift after the cutoff sequence is initiated and the imbalance of the charge state of hydrogen generation chamber 110. The DC component produced by hydrogen generation chamber 110 may be clamped to swing the AC wave into the positive range.

The capacitors in the reactive circuits (e.g., positive reaction circuit 300 and/or negative reaction circuit 400) may stabilize after the electrostatic release from the DC component. The inductors may provide timing sequences and preload for capacitor charge/discharge sequence while minimizing circuit resistance at peak input values. The capacitors may subsequently discharge under the influence of the AC components. The result may be an amplification of the embedded frequency waves providing a charge/discharge cycle at these given frequencies. This sequence may continue until the molecular polarity rotation of hydrogen generation chamber 110 is stabilized or the charge imbalance of the reactive circuit (e.g., positive reaction circuit 300 and/or negative reaction circuit 400) is diminished.

Feedback circuit 500 may be configured in reverse polarity to signal generation system 102 and signal processing system 106. Feedback circuit 500 may function as a secondary load to the reset reaction of hydrogen generation chamber 110. The capacitors (e.g., capacitors 504, 506) of feedback circuit 500 may collect electrons during the electrostatic discharge cycle, which may then be discharged through the light emitting diode (i.e., asymmetrically conductive component 508).

Feedback circuit 500 may assist in minimizing the electrostatic discharge impact on other portions of the reactive circuit (e.g., positive reaction circuit 300 and/or negative reaction circuit 400), which may result in the regulation of the timing of ON, OFF and Cutoff sequences. The light emitting diode (i.e., asymmetrically conductive component 508) may minimize electrostatic interference, thus assisting in maintaining peak charge amplitudes during the reset sequence of hydrogen generation chamber 110.

Specifically, the electrostatic charge may find a secondary pathway through the light emitting diode (i.e., asymmetrically conductive component 508). The light emitting diode (e.g., asymmetrically conductive component 508) may have a characteristic that allows static electricity to pass through while minimizing resistive load characteristics. This pathway may help regulate the discharge timing sequence while dissipating the accumulated charge on the capacitors (e.g., capacitors 504, 506). The switching or blocking characteristics of the light emitting diode (i.e., asymmetrically conductive component 508) may also minimize current loss during the OCP.

Due to the reverse polarity of feedback circuit 500, a portion of the recovered energy may be applied to the riding frequency during the cut off discharge sequence to assist in increasing the frequency amplitude. Further, the secondary electrostatic charge release may assist in the percentage of the desired gas output of hydrogen 112. The electrostatic charge energy may only be recoverable during a given time interval, wherein if the time interval is too long, the electrostatic charge may interfere with the proper sequencing of the OCP and OFCP. Accordingly, the values of capacitors 504, 506 may be adjusted to optimize the timing sequence.

Hydrogen Generation Chamber Configuration

Figure 6:
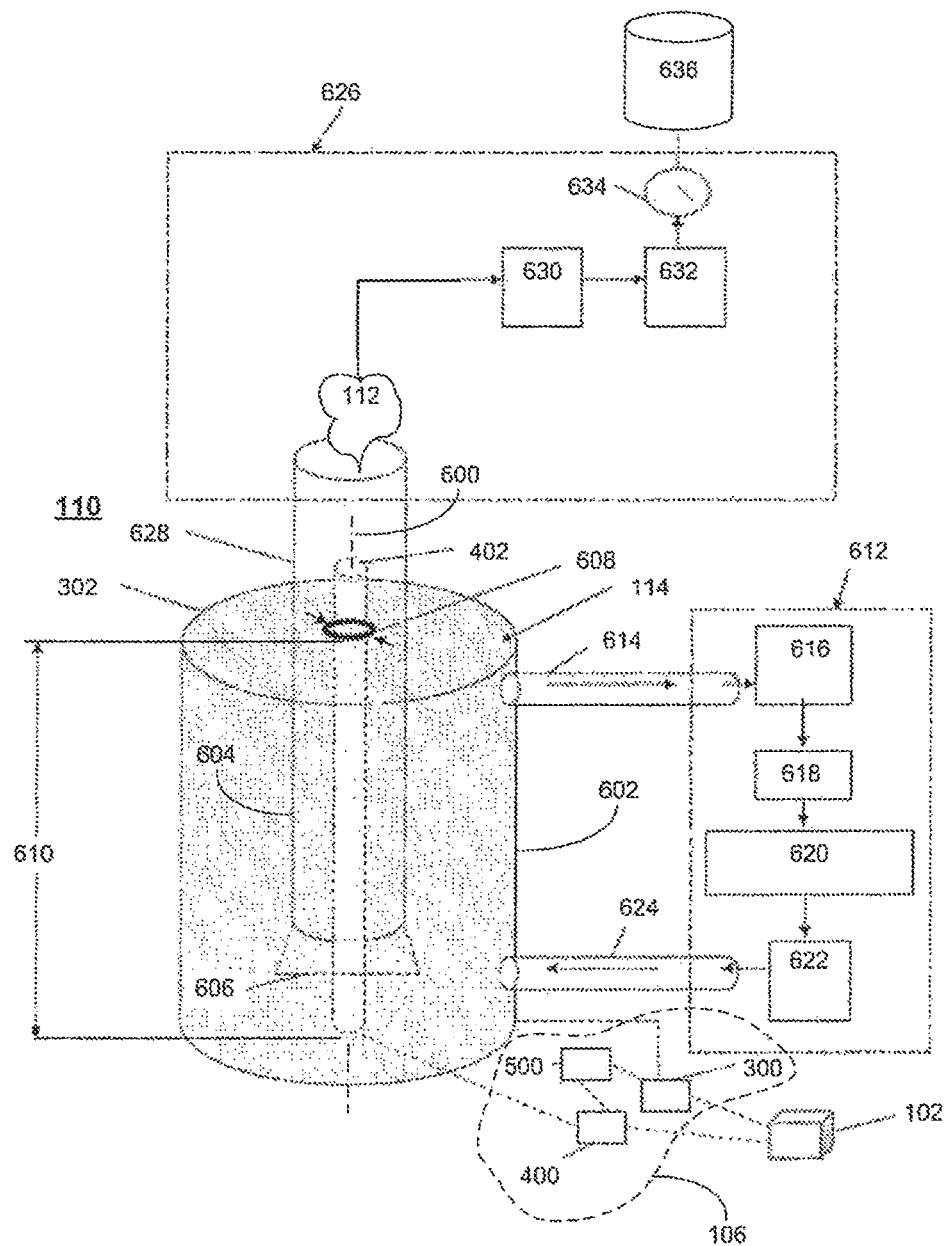
FIG. 6 is a diagrammatic view of a hydrogen generation chamber included within the hydrogen generation system of FIG. 1.

Referring to FIG. 6, there is shown one implementation of hydrogen generation chamber 110. Hydrogen generation chamber 110 may include at least one hollow cylindrical anode 302 configured to contain feedstock 114. At least one cathode 402 may be positioned within hollow cylindrical anode 302. Cathode 402 may be positioned along a longitudinal centerline (i.e., longitudinal centerline 600) of hollow cylindrical anode 302. Accordingly, hydrogen generation chamber 110 may be configured as a coaxial hydrogen generation chamber, as cathode 402 and hollow cylindrical anode 302 share a common centerline (namely longitudinal centerline 600).

Cathode 402 may be constructed, at least in part, of tungsten. For example, cathode 402 may be a tungsten rod. Hollow cylindrical anode 302 may be constructed, at least in part, of graphite. For example, hollow cylindrical anode 302 may be machined from a block of graphite.

Hollow cylindrical anode 302 may have an outer surface 602 and an inner surface 604, wherein the inside diameter (e.g., inside diameter 606) of hollow cylindrical anode 302 is 2,400% to 2,600% of (i.e., 24-26 times larger than) an outside diameter (e.g., outside diameter 608) of cathode 402 positioned within hollow cylindrical anode 302. For example and in a preferred embodiment, hollow cylindrical anode 302 may have an inside diameter (i.e., inside diameter 606) of 25.0 millimeters and cathode 402 positioned within hollow cylindrical anode 302 may have an outside diameter (e.g., outside diameter 608) of 1.0 millimeter.

Cathode 402 positioned within hollow cylindrical anode 302 may have a longitudinal length (i.e., longitudinal length 610) that is 190% to 210% of (i.e., 1.9-2.1 times longer than) inside diameter 606 of hollow cylindrical anode 302. For example and in a preferred embodiment, cathode 402 positioned within hollow cylindrical anode 302 may have a longitudinal length of 50.0 millimeters (when hollow cylindrical anode 302 has an inside diameter (i.e., inside diameter 606) of 25.0 millimeters).

Hydrogen generation chamber 110 may include feedstock recirculation system 612. For example and in this particular illustrative embodiment, feedstock 114 may be drawn through first conduit 614 and gas contractor 616 and into fuel reservoir 618. Fuel reservoir 618 may serve as a preconditioning zone to maintain feedstock and catalyst concentrations at desired levels. Feedstock 114 may be pulled through circulation pump 620 and then through heat exchanger 622 (to e.g., maintain a desired temperature for feedstock 114) and returned to hydrogen generation chamber 110 via conduit 624.

Gas collection system 626 may be coupled to hydrogen generation chamber 110 and may be configured to collect hydrogen 112 generated by hydrogen generation chamber 110 from feedstock 114. In this particular illustrative example, hydrogen 112 may be drawn through conduit 628 by vacuum pump 630, which then may pass through cold trap 632 and flow meter 634 and into e.g., storage container 636.

In certain implementations, hydrogen generation chamber 110 may include a plurality of discrete chambers. Accordingly, hollow cylindrical anode 600 may include a plurality of hollow cylindrical anodes 606 configured to contain feedstock 114 and cathode 602 may include plurality of cathodes 608 that may be positioned within plurality of hollow cylindrical anodes 606. Specifically, hydrogen generation chamber 110 may be configured so as to include multiple anode/cathode pair, thus increasing the production of hydrogen 112.

Controllable Reactive Circuit Configuration

Figure 7:
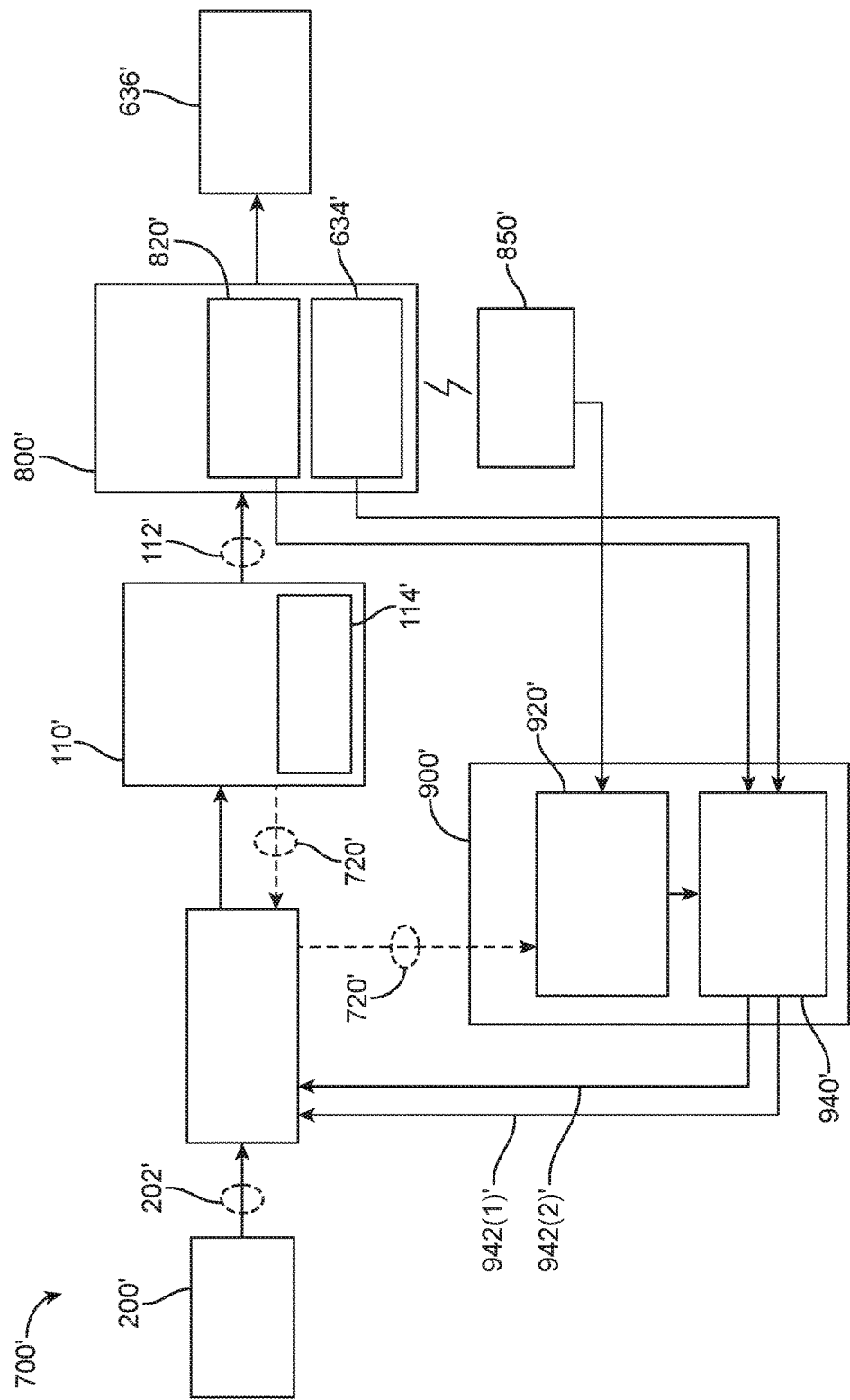
FIG. 7 is a diagrammatic view of a hydrogen generation system with a controllable reactive circuit in accordance with the disclosure.

Referring now to FIG. 7, another aspect of the disclosure is directed to a hydrogen generation system 100' with a controllable reactive circuit 700'. As will be discussed in greater detail below, the reactive circuit 700' includes inductive and capacitive values that may be selectively varied. When the inductive and capacitive values are selectively varied, this causes the load reactance on the hydrogen generation system 100' to vary. Varying the load reactance is advantageously used to adjust performance of the hydrogen generation system 100'.

The hydrogen generation system 100' includes a pulsed drive signal generator 200' to generate a pulsed drive signal 202', and a hydrogen generation chamber 110' to receive the pulsed drive signal and generate hydrogen 112' from a feedstock material 114' contained therein based on the pulsed drive signal 202'.

The controllable reactive circuit 700' is coupled between the pulsed drive signal generator 200' and the hydrogen generation chamber 110'. A hydrogen detection device 800' is coupled to the hydrogen generation chamber 110' to detect the generated hydrogen 112'. A controller 900' is coupled between the hydrogen detection device 800' and the controllable reactive circuit 700' to control the controllable reactive circuit 700' based on detection of the generated hydrogen 112'.

Hydrogen generated by the hydrogen generation chamber 110' may be detected in terms of purity and production rate, for example. The hydrogen detection device 800' may be a mass spectrometer 820' to determine the purity of the generated hydrogen 112'. Alternatively or in addition, the hydrogen detection device 800' may be a hydrogen flow meter 634' to determine the production rate of the generated hydrogen 112'.

Figure 8:
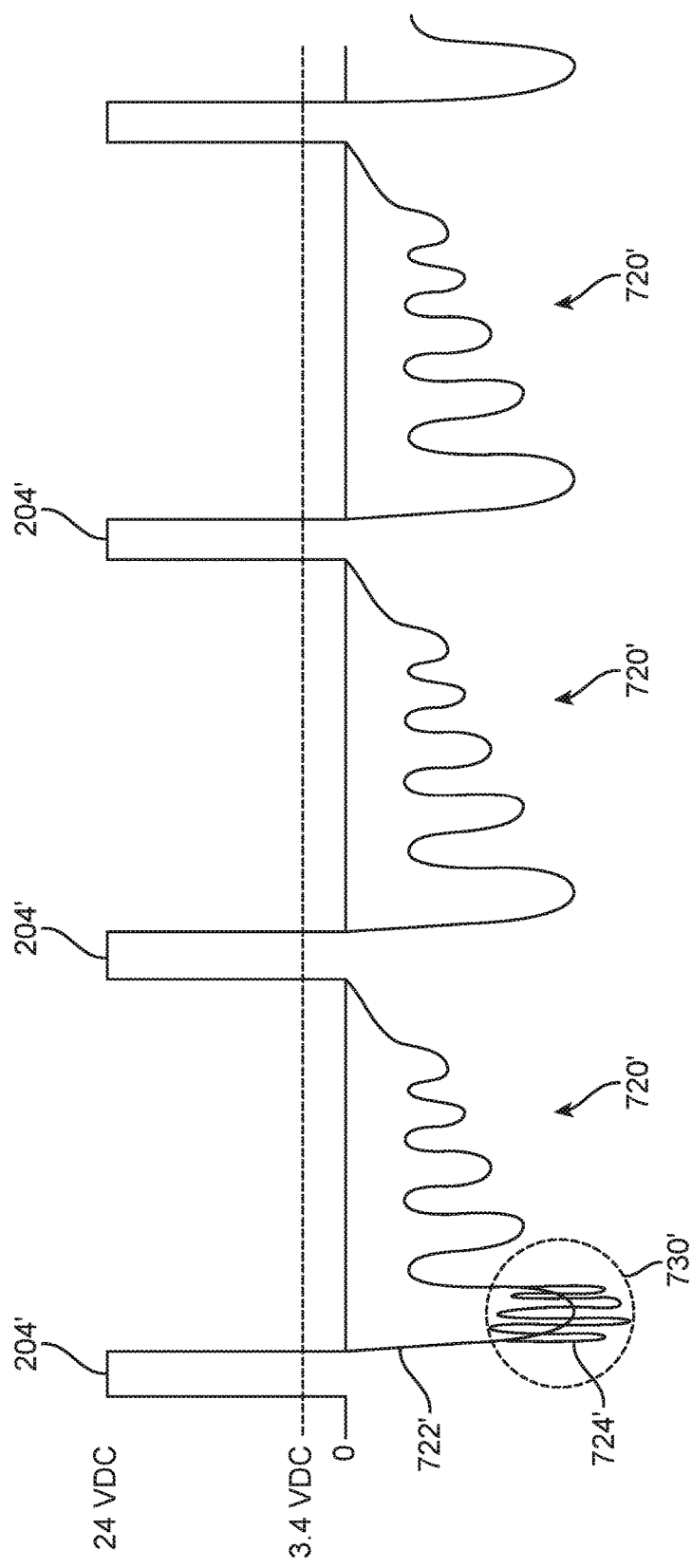
FIG. 8 is a graph illustrating damped sine waves generated as a negative latch between pulses of the pulsed drive signal in accordance with the disclosure.

Purity and production rate of the generated hydrogen as determined by the hydrogen detection device 800' may be used to measure performance of the hydrogen generation chamber 110'. The controllable reactive circuit 700' is advantageously used to adjust performance of the hydrogen generation system 100' by presenting a varying load reactance to damped sine waves 720' (as illustrated in FIG. 8) generated within the hydrogen generation chamber 110'. As the name implies, a damped sine wave 720' is a sinusoidal function whose amplitude approaches zero as time increases.

The damped sine waves 720' generated within the hydrogen generation chamber 110' are based on interactions between the pulsed drive signal 202' and the feedstock material 114'. The damped sine waves 720' are received by the controllable reactive circuit 700' as well as by the controller 900'. By the controller 900' selectively varying the load reactance within the controllable reactive circuit 700' subsequently formed damped sine waves 720' are re-energized which in turn can be used to improve performance of the hydrogen generation system 100'. Re-energized waves or signals in the general sense refer to electrical characteristic values, such as voltage, current, frequency, and/or waveform shapes being altered so as to have an enhanced effect within the hydrogen generation system 100'.

With the addition of the controllable reactive circuit 700' performance of the hydrogen generation system 100' is improved over that of a typical electrolytic cell. As an example, the purity of the generated hydrogen 112' may increase from a 0.7 range to a mid/upper 0.9 range when a varying load reactance is selectively presented to the damped sine waves 720' generated within the hydrogen generation chamber 110'. Similarly, the production rate of the generated hydrogen 112' increases significantly from a 0.7/0.8 Coefficient of Performance (COP) to greater than four times the COP (>400%).

The COP measurement used herein is defined as follows: a ratio of power consumption of the circuitry (measured in electrical watts) to the hydrogen gas production (measured in thermal watts). The power analysis is based on using a low heating value for hydrogen (i.e., 120 MJ/kg) to assess its energy content. Support for this value may be found in http://www.h2data.de, for example. Power analysis results are calculated using the following relationship: thermal watts (Wt) of hydrogen produced divided by electrical watts (We) consumed.

Since the controllable reactive circuit 700' is used to tune or adjust the damped sine waves 720' generated within the hydrogen generation chamber 110' to improve performance of the hydrogen generation system 100', the hydrogen generation chamber 110' may be considered to function as an antenna. In this case, the cathode 402' may be characterized as an emitter and the anode 302' may be characterized as a reflector. For discussion purposes, the cathode 402' may also be referred to as a first terminal and the anode 302' may also be referred to as a second terminal.

The hydrogen generation system 100' may further include a passive receive antenna 850' adjacent the hydrogen generation chamber 110' that is configured to receive transmissions from the chamber. The transmissions are in response to the hydrogen generation chamber 110' receiving the pulse drive signal 202'. The received transmissions are provided to the controller 900' for analysis so as to confirm that the hydrogen generation system 100' is operating correctly.

The pulsed drive signal 202' generated by the pulsed drive signal generator 200' is a pulsed DC drive signal. As an example, the pulsed DC drive signal entering the hydrogen generation chamber 110' may be set to one kilohertz and may have a peak voltage of 24 VDC with a 2% duty cycle. However, the voltage within the hydrogen generation chamber 110' is maintained at a lower level as discussed above, such as 3.4 VDC, for example.

The damped sine waves 720' occur between the DC pulses 204', as illustrated in FIG. 8. More particularly, the damped sine waves 720' occur as a negative latch between the DC pulses 204'. Each damped sine wave 720' includes a DC signal 722' with a plurality of low-level embedded interactive chamber signals 724'. The low-level embedded interactive chamber signals 724' are only shown within section 730' of the DC signal 722' so as to simplify the illustration. Certain ones of these low-level embedded interactive chamber signals 724' may correlate with chemical reactions that occur within the hydrogen generation chamber 110'.

Interactions between the pulsed DC drive signal 202' and the feedstock material 114' may be attributed to an electromagnetic pulse (EMP) occurring within the hydrogen generation chamber 110'. As readily understood by those skilled in the art, an EMP is a short burst of electromagnetic energy, and orientation of a pulse may occur as an electromagnetic field, for example. The EMP may be partially absorbed by the chamber materials, and may be partially reflected so that interfering patterns of EMP constructive and destructive nodes are created within the chamber. The interaction of the chamber and the EMP is reflected in the damped sine waves 720' detected from the chamber 110' between the DC pulses 204'.

An underlying theory of one embodiment of the present disclosure is that the generated electromagnetic field has an influence on the electrons within the hydrogen generation chamber 110'. This influence leads to the damped sine waves 720' having the embedded interactive chamber signals 724' which are low-level and chaotic in nature but may be correlated with the chemical reactions that occur within the hydrogen generation chamber 110'. The chemical reactions that are of interest are those that have an impact on the purity or production rate of the hydrogen 112' generated within the hydrogen generation chamber 110'.

In addition to the controllable reactive circuit 700' receiving the damped sine waves 720', the controller 900' also receives the damped sine waves 720'. The controller 900' includes an interactive chamber signal analyzer 920' to analyze the embedded interactive chamber signals 724' carried by the damped sine waves 720'. In one embodiment, an oscilloscope may be one such signal analyzer.

An example interactive chamber signal 724' may be found around 1420 MHz. Another example interactive chamber signal 724' may be found around 24.5 MHz. Yet another interactive chamber signal 724' may be found around 33.3 MHz. These example frequencies are not to be limiting.

The controller 900' may include a reactive load adjustment algorithm 940' that compares or correlates the output from the hydrogen detection device 800' to characteristics of one or more of the embedded interactive chamber signals 724' as determined by the interactive chamber signal analyzer 920'. Waveform shapes of the embedded interactive chamber signal 724' being analyzed is one of the characteristics used by the reactive load adjustment algorithm 940' when determining how to vary the reactive load within the controllable reactive circuit 700'. The reactive load adjustment algorithm 940' may operate as a lookup table when determining the reactive load by comparing the analyzed waveform characteristics with the purity or production rate of the generated hydrogen 112'.

Figure 9:
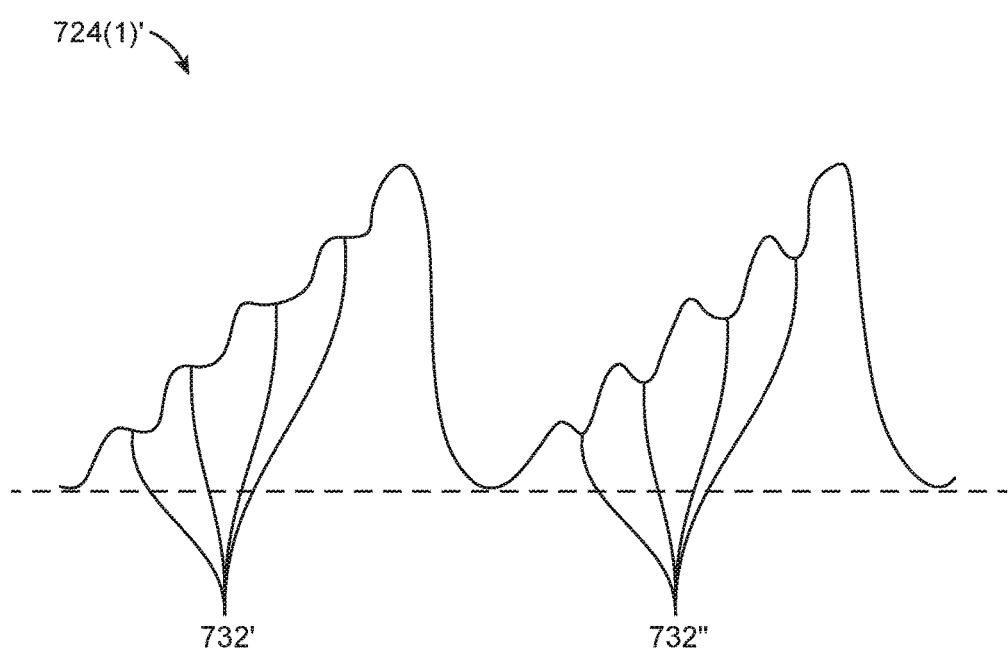
FIG. 9 is a graph illustrating one of the embedded interactive chamber signals included within the damped sine waves illustrated in FIG. 8.

Referring now to FIG. 9, a waveform shape of the 1420 MHz embedded interactive chamber signal 724(1)' will be discussed as an example. When the waveform shape of the 1420 MHz embedded interactive chamber signal 724(1)' being analyzed by the interactive chamber signal analyzer 920' has a stair-stepped shape, as indicated by reference 732', then the purity or flow rate of the generated hydrogen 112' has begun to decrease, then the load reactance of the controllable reactive circuit 700' is adjusted so that the waveform shape of subsequent 1420 MHz embedded interactive chamber signals 724(1)' has a more rounded or non-stair-stepped shape, as indicated by the more rounded stair 732".

Adjustment of the reactive load in the controllable reactive circuit 700' is made in terms of re-energizing generation of subsequent damped sine waves 720'. The above noted embedded interactive chamber signals 724' may be considered as event characteristics, and when these event characteristics are triggered by changing the load reactance of the controllable reactive load circuit 700', then the purity and/or production rate of the hydrogen 112' generated by the hydrogen generation chamber 110' may be adjusted.

More particularly, the controllable reactive circuit 700' is used to adjust the timing of subsequent embedded interactive chamber signals 724'. Adjusting the timing increases the slope or slant range of a sinusoidal stair-stepped waveform shape of subsequent embedded interactive chamber signals 724'. By varying the load reactance, the electronic speed is decreased to slow electron speed to form a retarded stair-stepped waveform shape 732". As the electron speed is decreased, the frequency of the embedded interactive chamber signals 724' being analyzed may be adjusted. This in turn provides more energy within the hydrogen generation chamber 110' which results in an improvement of the hydrogen generation system 100'.

Figure 10:
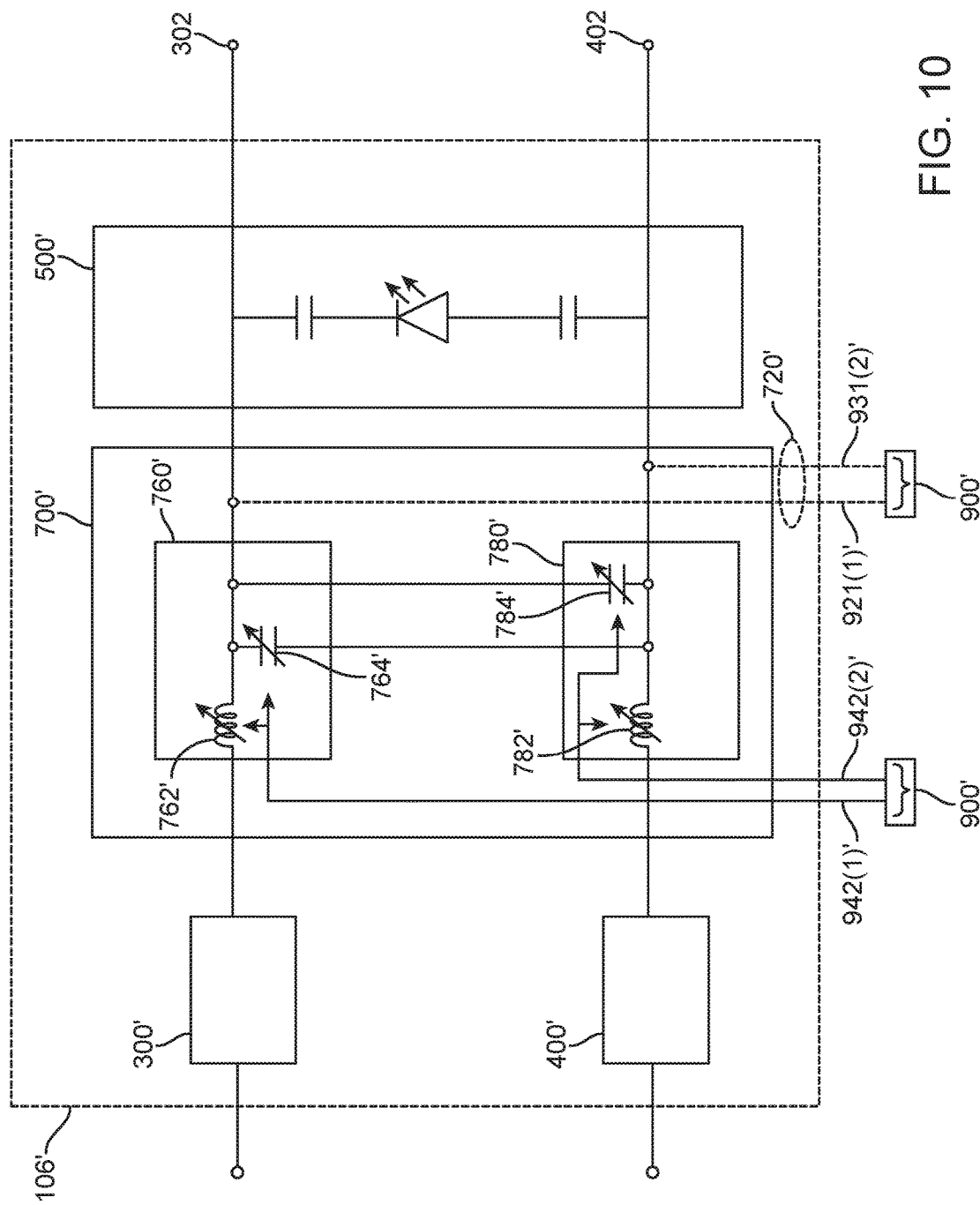
FIG. 10 is a more detailed diagrammatic view of the signal processing system with the controllable reactive circuit in accordance with the disclosure.

Referring now to FIG. 10, Controllable Reactive Circuit 700' includes the positive reactive circuit 300', the negative reactive circuit 400', and the feedback circuit 500'.

In one implementation, the controllable reactive circuit 700' includes a first variable load reactance circuit 760' between the positive reactive circuit 400' and the feedback circuit 500' and a second variable load reactance circuit 780' between the negative reactive circuit 400' and the feedback circuit 500'.

The first variable load reactance circuit 760' includes a variable inductive component 762' and a variable capacitive component 764' coupled to the variable inductive component 762'. Similarly, the second variable load reactance circuit 780' includes a variable inductive component 782' and a variable capacitive component 784' coupled to the variable inductive component 782'. The variable capacitive components 764', 784' are cross-coupled to one another between the first and second variable load reactance circuits 760', 780'.

In operation, the controller 900' is configured to adjust the variable inductive and capacitive components 762', 764' in the first variable load reactance circuit 760' via signal path 942(1)' and to adjust the variable inductive and capacitive components 782', 784' in the second variable load reactance circuit 780' via signal path 942(2)'.

The damped sine waves 720' as received by the controllable reactive circuit 700' are also received by the controller 900' via signal paths 921(1)', 921(2)'. By the controller 900' selectively varying the load reactance within the controllable reactive circuit 700' via the signal paths 942(1)', 942(2)' subsequently formed damped sine waves 720' are re-energized which in turn can be used to improve performance of the hydrogen generation system 100'.

Figure 11:
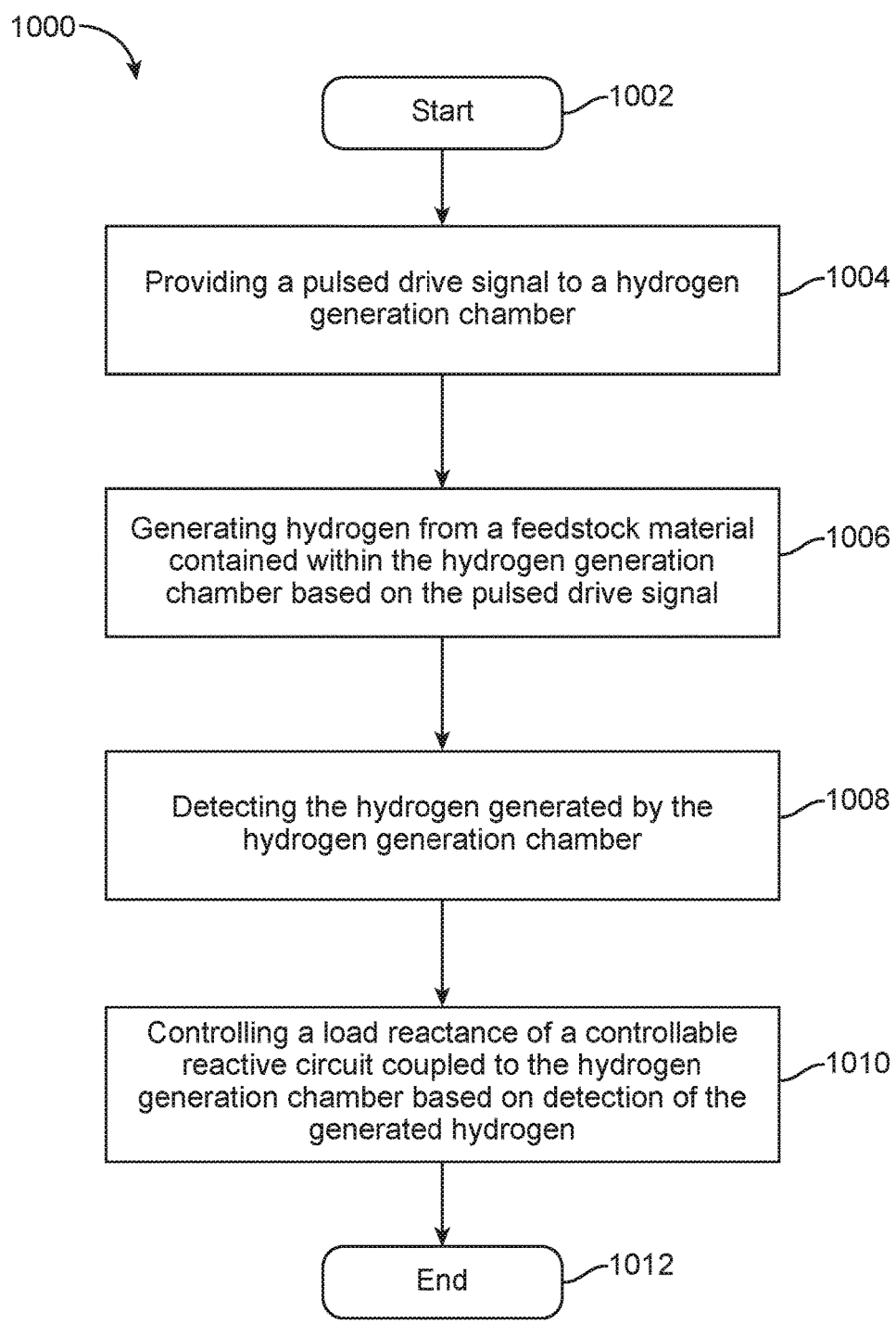
FIG. 11 is a flowchart illustrating a method for operating the hydrogen generation system with a controllable reactive circuit as illustrated in FIG. 7.

Referring now to the flowchart 1000 in FIG. 11, another aspect of the disclosure is directed to a method for operating the above-described hydrogen generation system 100'. From the start (Block 1002), the method includes providing a pulsed drive signal 202' to a hydrogen generation chamber 110' at Block 1004. Hydrogen 112' is generated from a feedstock material 114' contained within the hydrogen generation chamber 110' based on the pulsed drive signal 202' at Block 1006. Hydrogen 112' generated by the hydrogen generation chamber 110' is detected at Block 1008. The method further includes controlling a load reactance of a controllable reactive circuit 700' coupled to the hydrogen generation chamber 110' based on detection of the generated hydrogen 112' at Block 1010. The method ends at Block 1012.

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed.

What is claimed is:

1. A hydrogen generation system comprising:
    a pulsed drive signal generator configured to generate a pulsed drive signal;
    a hydrogen generation chamber configured to receive the pulsed drive signal and generate hydrogen from a feedstock material contained therein based on the pulsed drive signal;
    a controllable reactive circuit coupled between said pulsed drive signal generator and said hydrogen generation chamber;
    a hydrogen detection device coupled to said hydrogen generation chamber and configured to detect the generated hydrogen; and
    a controller configured to control said controllable reactive circuit based on detection of the generated hydrogen.

2. The hydrogen generation system according to claim 1 wherein said hydrogen detection device comprises a mass spectrometer to determine a purity of the generated hydrogen; and wherein said controller is configured to control said controllable reactive circuit based on the purity of the generated hydrogen.

3. The hydrogen generation system according to claim 1 wherein said hydrogen detection device comprises a hydrogen flow meter to determine a production rate of the generated hydrogen; and wherein said controller is configured to control said controllable reactive circuit based on the production rate of the generated hydrogen.

4. The hydrogen generation system according to claim 1 wherein damped sine waves are generated within said hydrogen generation chamber based on interaction between the pulsed drive signal and the feedstock material; and wherein said controller controls said controllable reactive circuit so as to present a varying load reactance to the damped sine waves.

5. The hydrogen generation system according to claim 4 wherein said controller is configured to control said controllable reactive circuit based on detection of the generated hydrogen and the damped sine waves.

6. The hydrogen generation system according to claim 5 wherein the damped sine waves include a DC signal with a plurality of embedded interactive chamber signals, with at least one of the embedded interactive chamber signals corresponding to the hydrogen being generated; and wherein said controller is further configured to analyze the at least one embedded interactive chamber signal corresponding to the hydrogen being generated.

7. The hydrogen generation system according to claim 6 wherein said controller analyzes a waveform shape of the at least one embedded interactive chamber signal corresponding to the hydrogen being generated, and varies the load reactance in said controllable reactive circuit based on the waveform shape.

8. The hydrogen generation system according to claim 4 wherein said pulsed drive signal generator generates a DC pulsed drive signal; and wherein the damped sine waves are generated between pulses of the DC pulsed drive signal.

9. The hydrogen generation system according to claim 1 wherein said controllable reactive circuit comprises:
    a first variable load reactance circuit coupled between a first terminal of said pulsed drive signal generator and a first terminal of said hydrogen generation chamber; and
    a second variable load reactance circuit coupled between a second terminal of said pulsed drive signal generator and a second terminal of said hydrogen generation chamber, wherein said first and second variable load reactance circuits are cross-coupled to one another.

10. The hydrogen generation system according to claim 9 wherein said first variable load reactance circuit comprises at least one variable inductive component, and at least one variable capacitive component; and wherein said second variable load reactance circuit comprises at least one variable inductive component, and at least one variable capacitive component.

11. A hydrogen generation system comprising:
a pulsed drive signal generator configured to generate a pulsed drive signal;
a hydrogen generation chamber configured to receive the pulsed drive signal and generate hydrogen from a feedstock material contained therein, with damped sine waves being generated within said hydrogen generation chamber based on interaction between the pulsed drive signal and the feedstock material;
a controllable reactive circuit having a controllable load reactance coupled between said pulsed drive signal generator and said hydrogen generation chamber;
a hydrogen detection device coupled to said hydrogen generation chamber and configured to detect the generated hydrogen; and
a controller configured to control the load reactance in said controllable reactive circuit based on detection of the generated hydrogen and the damped sine waves.

12. The hydrogen generation system according to claim 11 wherein said hydrogen detection device comprises a mass spectrometer so that detection of the generated hydrogen corresponds to a purity of the generated hydrogen.

13. The hydrogen generation system according to claim 11 wherein said hydrogen detection device comprises a hydrogen flow meter so that detection of the generated hydrogen corresponds to a production rate of the generated hydrogen.

14. The hydrogen generation system according to claim 11 wherein the damped sine waves include a DC signal with a plurality of embedded interactive chamber signals, with at least one of the embedded interactive chamber signals corresponding to the hydrogen being generated; and wherein said controller is further configured to analyze the at least one embedded interactive chamber signal corresponding to the hydrogen being generated.

15. The hydrogen generation system according to claim 14 wherein said controller analyzes a waveform shape of the at least one embedded interactive chamber signal corresponding to the hydrogen being generated, and varies the load reactance in said controllable reactive circuit based on the waveform shape.

16. The hydrogen generation system according to claim 11 wherein said pulsed drive signal generator generates a DC pulsed drive signal; and wherein the damped sine waves are generated between pulses of the DC pulsed drive signal.

17. The hydrogen generation system according to claim 11 wherein said controllable reactive circuit comprises:
a first variable load reactance circuit coupled between a first terminal of said pulsed drive signal generator and a first terminal of said hydrogen generation chamber; and
a second variable load reactance circuit coupled between a second terminal of said pulsed drive signal generator and a second terminal of said hydrogen generation chamber, wherein said first and second variable load reactance circuits are cross-coupled to one another.

18. A method for operating a hydrogen generation system comprising a pulsed drive signal generator to generate a pulsed drive signal, a hydrogen generation chamber to receive the pulsed drive signal and generate hydrogen from a feedstock material contained therein based on the pulsed drive signal, and a controllable reactive circuit coupled between the pulsed drive signal generator and the hydrogen generation chamber, the method comprising:
detecting the hydrogen generated by the hydrogen generation chamber; and
controlling a load reactance of the controllable reactive circuit based on detection of the generated hydrogen.

19. The method according to claim 18 wherein the hydrogen detection device comprises a mass spectrometer so that detection of the generated hydrogen corresponds to a purity of the generated hydrogen.

20. The method according to claim 18 wherein the hydrogen detection device comprises a hydrogen flow meter so that detection of the generated hydrogen corresponds to a production rate of the generated hydrogen.

21. The method according to claim 18 wherein damped sine waves are generated within the hydrogen generation chamber based on interaction between the pulsed drive signal and the feedstock material; and wherein the load reactance of the controllable reactive circuit is controlled to present a varying load reactance to the damped sine waves.

22. The method according to claim 21 wherein the damped sine waves include a DC signal with a plurality of embedded interactive chamber signals, with at least one of the embedded interactive chamber signals corresponding to the hydrogen being generated; and wherein controlling the load reactance of the controllable reactive circuit is further based on analyzing the at least one embedded interactive chamber signal corresponding to the hydrogen being generated.

23. The method according to claim 22 wherein the analyzing comprises analyzing a waveform shape of the at least one embedded interactive chamber signal corresponding to the hydrogen being generated.

24. The method according to claim 21 wherein the pulsed drive signal generator generates a DC pulsed drive signal; and wherein the damped sine waves are generated between pulses of the DC pulsed drive signal.

25. The method according to claim 18 wherein the controllable reactive circuit comprises a first variable load reactance circuit coupled between a first terminal of the pulsed drive signal generator and a first terminal of the hydrogen generation chamber, and a second variable load reactance circuit coupled between a second terminal of the pulsed drive signal generator and a second terminal of the hydrogen generation chamber, with the first and second variable load reactance circuits being cross-coupled to one another.

* * * * *